United States Patent [19]

Stumpe, Jr.

[11] 4,310,582

[45] Jan. 12, 1982

[54] BLENDS OF TRANS-POLYBUTADIENE AND MEDIUM VINYL POLYBUTADIENE

[75] Inventor: Nelson A. Stumpe, Jr., Bartlesville, Okla.

[73] Assignee: Phillips Petroleum Company, Bartlesville, Okla.

[21] Appl. No.: 808,001

[22] Filed: Jun. 20, 1977

[51] Int. Cl.³ .............................. B32B 3/28; C08L 9/00
[52] U.S. Cl. ............................ 428/182; 260/33.6 AQ; 260/33.6 UA; 260/42.44; 260/42.47; 260/42.54; 521/71; 521/140; 525/88; 525/236; 525/237
[58] Field of Search .................. 260/894, 887, 2.5 H, 260/7.5 L, 33.6 AQ, 33.6 UA, 42.44, 42.54, 42.47; 428/156, 182; 525/232, 140; 521/71, 140

[56] References Cited

U.S. PATENT DOCUMENTS

| | | | |
|---|---|---|---|
| 3,050,513 | 8/1962 | Zelinski et al. | 260/94.3 |
| 3,166,609 | 1/1965 | Wilder | 260/894 |
| 3,213,160 | 10/1965 | Crouch | 260/894 |
| 3,244,773 | 4/1966 | Crouch | 260/894 |
| 3,278,644 | 10/1966 | Zelinski | 260/894 |
| 3,301,840 | 1/1967 | Zelinski | 260/94.2 |
| 3,317,363 | 5/1967 | Weber | 156/210 |
| 3,344,206 | 9/1967 | Short | 260/894 |
| 3,476,830 | 11/1969 | Naarmann et al. | 260/879 |
| 3,553,051 | 1/1971 | Warrach et al. | 260/894 X |
| 3,725,331 | 4/1973 | Lesage et al. | 260/894 X |
| 3,830,881 | 8/1974 | Woods et al. | 260/889 |
| 3,852,225 | 12/1974 | Ishikawa et al. | 260/894 X |
| 3,897,260 | 7/1975 | Yaginuma et al. | 260/894 X |
| 3,926,933 | 12/1975 | Nayor | 260/94.3 |
| 3,959,545 | 5/1976 | Siedenstrang | 428/141 |
| 3,978,165 | 8/1976 | Stumpe, Jr. et al. | 260/894 |
| 3,981,830 | 9/1976 | Takeuchi et al. | 260/2.5 HA |

OTHER PUBLICATIONS

*Rubber and Plastics Age*, vol. 42 "New Controlled-Structure Polymers of Butadiene", pp. 276–282 (1961).
*Rubber World* vol. 138, "Low-Temperature Properties of 80 Percent CIS-Polybutadiene", pp. 75–80 (1958).

*Primary Examiner*—J. Ziegler

[57] ABSTRACT

*Rubber and Plastics Age*, vol. 42 "New Controlled-Structure Polymers of Butadiene", pp. 276–282 (1961). range of about 25 to about 65 percent and a minor amount of polybutadiene having trans-1,4-addition of at least about 70 percent. Also vulcanized cellular rubber compositions in which the rubber comprises a blend of a major amount of polybutadiene having 1,2-addition in the range of about 25 to about 65 percent and a minor amount of polybutadiene having trans-1,4-addition of at least about 70 percent.

19 Claims, No Drawings

BLENDS OF TRANS-POLYBUTADIENE AND MEDIUM VINYL POLYBUTADIENE

This invention relates to rubber compositions. In one aspect the invention relates to a method for decreasing the cold flow of medium vinyl polybutadienes. In another aspect the invention relates to a novel composition containing medium vinyl polybutadiene and trans-polybutadiene in which the tendency of medium vinyl polybutadiene to cold flow is substantially reduced.

In recent years, a great deal of research work has been conducted in the field of olefin polymerization. A great advance in the field was the discovery of the "stereospecific" catalyst systems. With the stereospecific catalysts it is possible to obtain diene polymers having a broad range of cis-1,4-addition, trans-1,4-addition, and vinyl-1,2-addition. At one extreme it is possible with such catalysts to obtain high cis polybutadiene having 85 percent or more of cis-1,4-addition. At another extreme it is possible to obtain high trans-polybutadienes having 70 percent or more of trans-1,4-addition. At still another extreme it is possible to obtain polybutadienes having 70 percent or more of vinyl-1,2-addition. It is also possible with the stereospecific catalysts to obtain butadienes having combinations of cis-1,4, trans-1,4 and vinyl-1,2-addition within the three extremes.

The present invention is related to those polybutadienes having about 25 to about 65 percent of vinyl-1,2-addition. Such polybutadienes are generally referred to as medium vinyl polybutadienes. Preferably such medium vinyl polybutadienes have cis-1,4-addition in the range of about 15 to about 35 percent and trans-1,4-addition of about 15 to about 40 percent.

Such medium vinyl polybutadienes having a Mooney viscosity of less than about 50 are particularly suitable for replacing styrene-butadiene copolymers as the major rubber in rubber compositions used in preparing sponge, i.e., cellular, rubber products such as those conventionally being employed as rug underlay. Generally the conventional produced rug underlay is a sheet of foamed vulcanized styrene-butadiene copolymer which has a corrugated effect on both the upper and lower surfaces.

The method for producing such styrene-butadiene sponge, i.e., cellular, rubber corrugated products is well known in the art. In general, the method involves preparing a composition of rubber, blowing agent, extender, filler, and vulcanizer, forming the composition into a sheet, laying the sheet upon a moving wire screen, then heating the rubber sheet to soften it so that draping through the screen occurs, continuing the heating to cause the blowing and vulcanization to occur, and then cooling the vulcanized product.

In working with medium vinyl polybutadienes, particularly those suited for rug underlay compositions, i.e., those having Mooney viscosities (ML-4 at 212° F.) of less than about 50, a certain amount of difficulty has been encountered in packaging, shipping, and storage due to the tendency of the polymer to cold flow when in the unvulcanized state. For example, if cracks or punctures develop in the package used in storing the polymer, the polymer tends to flow from the package with a resulting loss or contamination or sticking together of stacked packages.

It is therefore an object of this invention to provide a method for reducing the cold flow in medium vinyl polybutadiene.

Another object of this invention is to provide a novel composition of a major amount of medium vinyl polybutadiene and a minor amount of a high trans-polybutadiene which composition has much lower cold flow than such medium vinyl polybutadiene.

Another object of this invention is to provide a novel composition of a major amount of medium vinyl polybutadiene and a minor amount of high transpolybutadiene, which composition is suitable for use as the major rubber component in cellular rubber compositions.

Another object is to provide a novel cellular rubber composition.

Broadly speaking, the present invention resides in a novel rubbery composition which comprises a medium vinyl polybutadiene and a high transpolybutadiene. A particularly useful composition within the invention is a rubbery composition comprising a blend of (1) a major amount of a medium vinyl polybutadiene having vinyl-1,2-addition in the range of about 25 to about 65 percent and (2) a minor amount of high trans polybutadiene containing trans-1,4-addition of at least 70 percent and having an inherent viscosity no greater than 5, wherein the amount of said high trans polybutadiene is less than about 40 weight percent of the total weights of said high trans polybutadiene and said medium vinyl polybutadiene.

The amount of high trans polybutadiene employed will depend upon the amount of improvement in cold flow desired and the effect of the high trans polybutadiene on the other polymer properties that are desired for a particular application. Generally the amount of high trans polybutadiene employed will be in the range of about 0.1 to about 10 weight percent of the total weight of the medium vinyl polybutadiene and the high trans polybutadiene. Preferably the amount of high trans polybutadiene is in the range of about 3 to about 7 weight percent of the total weight of the medium vinyl polybutadiene and the high trans polybutadiene.

The present invention is applicable to blends of high trans-polybutadiene and medium vinyl-polybutadiene regardless of the method employed in preparing the polymers. One method that can be used in preparing the high trans-polybutadiene comprises the step of polymerizing 1,3-butadiene in the presence of a catalyst composition comprising (a) a complex aluminum hydride of an alkali metal such as lithium aluminum hydride, and (b) titanium tetraiodide. The amount of the hydride used in the catalyst composition is usually in the range of 0.5 to 6 mols per mol of titanium tetraiodide with a preferred mol ratio being in the range of 1.3 to 3.0. The polymerization is generally carried out at a temperature in the range of 10° C. to 80° C. in the presence of an inert hydrocarbon diluent. Diluents suitable for use include aromatics, such as benzene and toluene, and paraffins, such as normal pentane and isooctane. It is frequently preferred to charge the complex aluminum hydride to the reactor as a solution in a dialkyl ether, such as diethyl ether. This method for preparing transpolyisoprenes and transpolybutadienes is described in detail by R. P. Zelinski and D. R. Smith in U.S. Pat. No. 3,050,513, the disclosure of which is incorporated herein by reference. Another method for preparing high trans-polybutadienes is described by Floyd E. Naylor in U.S. Pat. No. 3,926,933, the disclosure of which is incorporated herein by reference. A method for preparing the medium vinyl-polybutadienes is described in U.S. Pat. No. 3,301,840, the disclosure of which is incorporated herein by reference.

Preferably the medium vinyl polybutadiene employed has cis-1,4-addition in the range of about 15 to about 35 percent and trans-1,4-addition in the range of about 15 to about 40 percent. Preferably the high trans polybutadiene has trans-1,4-addition in the range of about 85 to about 95 percent.

To obtain the rubbery composition of the present invention the medium vinyl polybutadiene and the high trans polybutadiene can be blended by any method which will give a substantially homogeneous blend. A convenient method is to blend the materials on a roll mill, in a Banbury mixer, or similar kneading device. In another method for blending the materials, solutions of the polymers in the hydrocarbon solvent are blended and the products are recovered by conventional means, such as by steam stripping, coagulation in an alcohol, such as isopropyl alcohol, or the like. Another convenient method for preparing the blend is to blend the polymer solutions as they are recovered from the reactor and then recovering by conventional means as just mentioned. After the blending operation is completed, the polymer composition can then be packaged and stored or transferred for utilization elsewhere. The rubbery composition of the present invention can be blended, compounded, fabricated, and cured according to procedures which are well known in the rubber art.

The blend of medium vinyl-polybutadiene and high trans-polybutadiene of the present invention is particularly suitable for making cellular rubber products in general, and corrugated cellular or corrugated sponge rubber rug underlay in particular. As indicated above it has been found that medium vinyl polybutadienes having 212° F. ML-4 Mooney viscosity of less than 50 are particularly well suited for producing sponge rubber products. Generally for producing sponge rubber underlay medium vinyl polybutadiene is suitable which has an inherent viscosity in the range of about 1.4 to about 2.2. (The term inherent viscosity as used in this disclosure refers to a value obtained by dissolving one-tenth of a gram of a polymer in 100 ml of toluene, determining the viscosity of the polymer solution at 77° F., dividing the viscosity of the polymer solution at 77° F. by the viscosity of toluene at 77° F. to obtain a relative viscosity, and then dividing the natural logarithm of the relative viscosity by the weight of the polybutadiene dissolved in the toluene.) Preferably for producing sponge rubber underlay the medium vinyl polybutadiene has 212° F. ML-4 Mooney viscosity in the range of about 20 to about 30.

The addition of small amounts of high trans polybutadiene reduces the cold flow of the medium vinyl polybutadiene without adversely affecting its suitability for producing sponge rubber compositions having desirable properties. Generally for producing sponge rubber underlay high trans polybutadiene is suitable which has an inherent viscosity in the range of about 0.5 to about 4.0, preferably the high trans polybutadiene has an inherent viscosity in the range of about 1.5 to about 1.7.

The recipe used in preparing sponge rubber products with the medium vinyl polybutadiene-high trans polybutadiene blend as the major rubber component, also generally includes about 100 to about 400 parts by weight of a non-reinforcing filler per hundred parts by weight of the rubber and about 50 to about 200 parts by weight of extender oil per hundred parts by weight of the rubber. Of course suitable amounts of vulcanizing agent and blowing agent are also employed. Other additives commonly employed in such recipes can also be employed, i.e. antioxidants, pigments, etc. The amounts of vulcanizing agent, blowing agent, filler, and extender oil needed to obtain a desired balance of properties can be readily determined by routine experimentation by those skilled in the compounding of sponge rubber compositions. The blowing and vulcanizing of the medium vinyl polybutadiene sponge composition can be carried out using the same techniques conventionally employed in preparing styrene-butadiene sponge rubber compositions.

A more complete understanding of this invention and its advantages will be obtained by referring to the following examples. In the following examples the Mooney viscosity reported was obtained by ASTM-D-1417 No. 11. The cold flow was determined by extending the rubber through a ¼ inch orifice at 3.5 psi pressure and a temperature of 50° C. (122° F.). After allowing 10 minutes to reach steady state, the rate of extrusion was measured and the values reported as cold flow in milligrams per minute. The percent trans, vinyl, and cis functionality was determined by infrared spectroscopy.

EXAMPLE I

A medium vinyl-polybutadiene rubber was made by polymerizing butadiene in n-hexane solvent using n-butyl lithium as initiator, and in the presence of tetramethylethylenediamine to control the vinyl content. The initial polymerization temperature was about 49° C. The peak polymerization temperature was 96° C. After the polymerization was complete, the reaction was short-stopped with the addition of tin tetrachloride as a coupling agent. The solid coupled medium vinyl-polybutadiene recovered had the following characteristics:

| | |
|---|---|
| 212° F. ML-4 Mooney viscosity | 26 |
| I.V. | 1.66 |
| Trans-1,4-addition, % | 30.7 |
| Vinyl-1,2-addition, % | 48.6 |
| Cis-1,4-addition, % | 20.7 |
| Cold Flow, mg/min. | 3.73 |

This medium vinyl-polybutadiene was blended with various other rubbery polymers having zero cold flow.

One of the rubbery polymers blended with a first portion of the medium vinyl polybutadiene was a high trans-polybutadiene which was made by polymerizing 100 parts by weight of 1,3-butadiene in 780 parts by weight of n-hexane in the presence of an initiator comprising 0.135 parts by weight of $LiAl_2H_2$ and 2.2 parts by weight of $TiI_4$ in 3.7 parts by weight of ethyl ether. The polymerization was conducted at 74° C. for 4 hours. The recovered high trans-polybutadiene contained trans-1,4-addition of 90 percent and had an inherent viscosity of 1.52. The high trans-polybutadiene also had a melting point of 184° C. and a 230° F. (110° C.) ML-4 Mooney viscosity of 31.

Another rubbery polymer blended with a second portion of the medium vinyl-polybutadiene was a 60/40 butadiene/styrene radial block copolymer.

Another rubbery polymer blended with a third portion of the medium vinyl-polybutadiene was a hydrogenated polybutadiene having an inherent viscosity of 0.86. The hydrogenated polybutadiene was obtained by hydrogenating a medium vinyl polybutadiene having 1,2-vinyl addition of 27.4 percent and 1,4-trans addition of 40.1 percent.

ing. The characteristics of the resulting composition are summarized in Table II.

TABLE II

| | Composition No. | | | | | | | |
|---|---|---|---|---|---|---|---|---|
| | 5 | 6 | 7 | 8 | 9 | 10 | 11 | 12 |
| | Cis | | Linear | | SiCl₄ Coupled | | SNCl₄ Coupled | |
| Type of Major Rubber | Polybutadiene | | MVPBd | | MVPBd | | MVPBd | |
| Amount of Major Rubber, parts | 100 | 95 | 100 | 95 | 100 | 95 | 100 | 95 |
| Trans-polybutadiene, parts | — | 5 | — | 5 | — | 5 | — | 5 |
| Dump Temp., °F. | 275 | 280 | 320 | 310 | 330 | 330 | 310 | 315 |
| Mixing Time, min. | 3 | 3 | 3 | 3 | 2 | 2.25 | 2 | 2 |
| Cold Flow, mg/min. | 2.48 | 2.16 | 5.58 | 1.82 | 0.92 | 0.16 | 4.54 | 1.89 |

Each of these blends was prepared by milling on a 195° F. (90.5° C.) roll mill for about 4–5 minutes. As a control a sample of the medium vinyl polybutadiene was also subjected to such milling. The characteristics of the resulting compositions are summarized in Table I.

TABLE I

| Composition No. | 1 | 2 | 3 | 4 |
|---|---|---|---|---|
| Medium vinyl polybutadiene, phr | 100 | 95 | 95 | 95 |
| Trans polybutadiene, phr | — | 5 | — | — |
| Hydrogenated polybutadiene, phr | — | — | 5 | — |
| 60/40 butadiene/styrene block copolymer phr | — | — | — | 5 |
| Cold flow | 4.62 | 1.52 | 4.56 | 3.85 |
| Mooney (ML-4 @ 212° F.) | 27 | 27.5 | 25 | 29.5 |

The data in Table I clearly shows that trans polybutadiene was much more effective in reducing the cold flow of medium vinyl polybutadiene than the other zero cold flow rubbery polymers.

EXAMPLE II

A small amount of the high trans polybutadiene employed in the previous example was blended with each of four other polybutadiene polymers, viz. a high cis polybutadiene, a linear medium vinyl polybutadiene, a silica tetrachloride coupled medium vinyl polybutadiene, and a tin tetrachloride coupled medium vinyl polybutadiene. The high cis polybutadiene had a 212° F. ML-4 Mooney viscosity of 45.5 and contained cis 1,4-addition of 91.5 percent, trans 1,4-addition of 3.6 percent, and vinyl 1,2-addition of 4.9 percent. The linear medium vinyl polybutadiene had an inherent viscosity of 2.08, a 212° F. ML-4 Mooney viscosity of 46.5, and contained vinyl 1,2-addition of 52.9 percent, trans 1,4-addition of 25.5 percent, and cis 1,4-addition of 21.6 percent. The SiCl₄ coupled medium vinyl polybutadiene had an inherent viscosity of 2.16, a 212° F. ML-4 Mooney viscosity of 43.0, and contained vinyl 1,2-addition of 45.1 percent, trans 1,4-addition of 30 percent, and cis 1,4-addition of 24.9 percent. The SnCl₄ coupled medium vinyl polybutadiene had an inherent viscosity of 1.66, a 212° F. ML-4 Mooney viscosity of 23.5 and contained vinyl 1,2-addition of 48.6 percent, trans 1,4-addition of 30.7 percent, and cis 1,4-addition of 20.7 percent.

Each of the blends was prepared by milling the two rubbery polymers in a midget Banbury with a 140° F. jacket for about 2–3 minutes to a dump temperature in the range of 275°–330° F. As a control a sample of each major rubbery polymer was also subjected to such milling.

This data demonstrates that the reduction in cold flow of medium vinyl polybutadienes by addition of high trans polybutadiene is remarkably greater than the effect that high trans polybutadiene had on the cold flow of high cis polybutadiene. In the above data the addition of 5 phr of high trans polybutadiene to high cis polybutadiene decreased the cold flow by only about 13 percent. The addition of that amount of the high trans polybutadiene to the medium vinyl polybutadiene, on the other hand, resulted in reduction of cold flow in the range of about 58 to about 82 percent. The high trans polybutadiene reduced the cold flow of the linear and SNCl₄ coupled medium vinyl polybutadienes so much that the cold flow was less than that of the blend of the high cis and high trans polybutadiene, even though the high cis alone had lower cold flow than either of those two medium vinyl polybutadiene.

EXAMPLE III

The rubber blend compositions of Example II were compounded with ingredients to produce several sponge rubber rug underlay products. The properties of these products were compared to those of a sponge rubber rug underlay prepared using a conventional recipe employing styrene/butadiene copolymers. The styrene/butadiene copolymer was a 1206 solution copolymer (styrene/butadiene of 25/75) having a 212° F. ML-4 Mooney viscosity of 33. The properties of the respective products is summarized in Tables III and IV. Each composition was cured at 340° F. for 6 minutes. The ingredients employed in preparing the product and their parts by weight were as follows:

| Rubber | 100 |
|---|---|
| Calcium Carbonate | 225 |
| Dixie Clay[a] | 50 |
| Calcium Silicate | 3 |
| Zinc Oxide | 4 |
| Oleic Acid | 10 |
| Petrolatum | 15 |
| Naphthenic Oil | 62.5, 82.5, or 102.5 |
| Agerite Superlite Liquid[b] | 1 |
| Unicel S[c] | 7 |
| Sodium Bicarbonate | 7 |
| Sulfur (with 2–3% MgCO₃) | 5.5 with 62.5 and 82.5 oil (6 with 102.5 oil) |
| 2,2'-Benzothiazyl disulfide | 2.0 with 62.5 and 82.5 oil (2.2 with 102.5 oil) |
| Tetramethylthiuram disulfide | 1.0 with 62.5 and 82.5 oil (1.1 with 102.5 oil) |
| Zinc dimethyldithiocarbamate | 0.5 |

[a]Kaolin clay.
[b]Polybutyl bisphenol A mixture.
[c]50% sodium bicarbonate in oil.

TABLE III

| Product No. | 1 | 2 | 3 | 4 | 5 | 6 | 7 |
|---|---|---|---|---|---|---|---|
| Major Rubber | High Cis PBd | High Cis PBd | Linear MVPBd | Linear MVPBd | SiCl$_4$ MVPBd | SiCl$_4$ MVPBd | High Cis PBd |
| High trans polybutadiene, %[4] | 0 | 5 | 0 | 5 | 0 | 5 | 0 |
| Naphthene Oil, phr | 82.5 | | | | | | 102.5 |
| Properties | | | | | | | |
| Tensile, psi | 1.7 | 1.6 | 1.3 | 1.3 | 1.3 | 1.5 | 1.2 |
| Load deflection | 5.6 | 5.4 | 5.4 | 4.8 | 5.4 | 5.7 | 4.8 |
| Compression Set, % | 19.8 | 20.2 | 20.0 | 20.1 | 17.9 | 18.4 | 23.0 |
| Porosity, Structure[1] | MED | MED | FINE | FINE | FINE | FINE | MED |
| Porosity, Uniformity[2] | FAIR | FAIR | GOOD | GOOD | FAIR | GOOD | FAIR |
| Drape[3] | POOR− | POOR− | FAIR | FAIR+ | POOR+ | POOR | POOR |

[1] These values are based on a rating of the pores as being FINE, MEDIUM, or COARSE.
[2] These values are based on a rating of the uniformity of pore distribution as being POOR, FAIR, or GOOD.
[3] These values represent how well the composition draped as reflected by the length and depth of marks which result when the composition upon heating sags into contact with certain wires on the supporting wire mesh. A rating of POOR, or GOOD is assigned. Plus and minus signs are employed to denote relative differences within a particular rating, i.e. a drape of POOR− is not as good as a drape of POOR and a drape of POOR+ is better than a drape of POOR.
[4] Percentage based upon weight of major rubber and high trans polybutadiene.

TABLE IV

| Product No. | 8 | 9 | 10 | 11 | 12 | 13 | 14 | 15 |
|---|---|---|---|---|---|---|---|---|
| Major Rubber | High Cis PBD | Linear MVPBd | Linear MVPBd | SiCl$_4$ MVPBd | SiCl$_4$ MVPBd | SnCl$_4$ MVPBd | SnCl$_4$ MVPBd | Sty/Bd |
| High trans polybutadiene, %[4] | 5 | 0 | 5 | 0 | 5 | 0 | 5 | 0 |
| Naphthenic Oil, phr | 102.5 | | | | | 62.5 | | |
| Properties | | | | | | | | |
| Tensile, psi | 0.8 | 0.8 | 1.0 | 0.9 | 0.9 | 1.2 | 1.3 | 1.5 |
| Load deflection | 4.0 | 4.2 | 4.2 | 4.9 | 5.0 | 6.5 | 6.8 | 6.5 |
| Compression Set. % | 21.3 | 17.1 | 18.1 | 16.8 | 16.8 | 15.3 | 14.3 | 16.6 |
| Porosity, Structure[1] | COARSE | FINE | FINE | FINE | MED | MED | MED | MED |
| Porosity, Uniformity[2] | POOR | GOOD | GOOD | FAIR | FAIR | FAIR | FAIR | FAIR |
| Drape[3] | POOR | GOOD | GOOD | FAIR+ | FAIR+ | FAIR+ | FAIR | FAIR+ |

[1] These values are based on a rating of the pores as being FINE, MEDIUM, or COARSE.
[2] These values are based on a rating of the uniformity of pore distribution as being POOR, FAIR, or GOOD.
[3] These values represemt how well the composition draped as reflected by the length and depth of marks which result when the composition upon heating sags into contact with certain wires on the supporting wire mesh. A rating of POOR, FAIR, or GOOD is assigned. Plus and minus signs are employed to denote relative differences within a particular rating, i.e. a drape of POOR− is not as good as a drape of POOR and a drape of POOR+ is better than a drape of POOR.
[4] Percentage based upon weight of major rubber and high trans polybutadiene.

The data in Tables III and IV demonstrates that medium vinyl polybutadiene can be used to obtain cellular rubber products comparable to conventional styrene/butadiene cellular rubber products. The data also demonstrates that the incorporation of a small amount of high trans polybutadiene with the medium vinyl polybutadiene did not cause any significant difference in the properties of the cellular rubber product. Even at high oil levels the high cis polybutadiene compositions did not drape as well as the medium vinyl polybutadiene compositions. The high cis polybutadiene composition containing 102.5 phr oil were also extremely sticky and harder to handle than the medium vinyl polybutadiene compositions.

As will be evident to those skilled in the art, many variations and modifications can be practiced in view of the foregoing disclosure. Such variations and modifications are clearly believed to come within the spirit and scope of the invention.

What is claimed is:

1. A rubbery composition consisting essentially of a blend of
   (1) medium vinyl polybutadiene containing vinyl-1,2-addition in the range of 25 to 65 percent and (2) high trans polybutadiene containing trans 1,4-addition of at least about 70 percent and being an inherent viscosity no greater than 5, wherein the amount of said high trans polybutadiene is less than 40 weight percent of the total weight of said high trans polybutadiene and said medium vinyl polybutadiene, the inherent viscosity being determined by dissolving the high trans polybutadiene in toluene, determining the viscosity of the polymer solution at 77° F., dividing the viscosity of the polymer solution at 77° F. by the viscosity of the toluene at 77° F. to obtain a relative viscosity, and then dividing the natural logarithm of the relative viscosity by the weight of polybutadiene dissolved in the toluene.

2. A composition according to claim 1 wherein the amount of the high trans polybutadiene is in the range of about 0.1 to about 10 weight percent of the total weight of the medium vinyl polybutadiene and the high trans polybutadiene.

3. A composition according to claim 2 wherein the medium vinyl polybutadiene contains trans-1,4-addition in the range of about 15 to about 40 percent and cis-1,4-addition in the range of about 15 to about 35 percent.

4. A composition according to claim 3 wherein the high trans polybutadiene has trans-1,4-addition in the range of about 85 to about 95 percent.

5. A composition according to claim 3 wherein the medium vinyl polybutadiene has an ML-4 212° F. Mooney viscosity of less than about 50.

6. A composition according to claim 5 wherein the medium vinyl polybutadiene has an inherent viscosity in the range of about 1.4 to about 2.2 and said high trans polybutadiene has an inherent viscosity in the range of about 0.5 to about 4.0, said inherent viscosity being determined by dissolving the respective polybutadiene in toluene, determining the viscosity of the polymer solution at 77° F., dividing the viscosity of the polymer solution at 77° F. by the viscosity of toluene at 77° F. to obtain the relative viscosity, and then dividing the natural logarithm of the relative viscosity by the weight of the polybutadiene dissolved in the toluene.

7. A composition according to claim 6 wherein the ML-4 212° F. Mooney viscosity of the medium vinyl polybutadiene is in the range of about 20 to about 30.

8. A composition according to claim 7 wherein the amount of high trans polybutadiene is in the range of about 3 to about 7 weight percent of the total weight of the medium vinyl polybutadiene and the high trans polybutadiene.

9. A composition according to claim 8 wherein the high trans polybutadiene has trans-1,4-addition in the range of about 85 to about 95 percent.

10. A composition according to claim 9 wherein the high trans polybutadiene has an inherent viscosity in the range of about 1.5 to about 1.7.

11. A vulcanized cellular rubber product wherein the major amount of rubber in said product is the composition of claim 1.

12. A product according to claim 11 which contains about 100 to about 400 parts by weight of non-reinforcing filler per hundred parts by weight of rubber and about 50 to about 200 parts by weight of extender oil per hundred parts by weight of rubber.

13. A vulcanized cellular rubber product wherein the major amount of rubber in said product is the composition of claim 10 and wherein said composition contains about 100 to about 400 parts by weight of non-reinforcing filler per hundred parts by weight of rubber and about 50 to about 200 parts by weight of extender oil per hundred parts by weight of rubber.

14. A product according to claim 13 comprising a sheet having a corrugated effect on both its upper and lower surfaces.

15. A product according to claim 14 wherein the rubber in said product consists of said medium vinyl polybutadiene and said high trans polybutadiene.

16. A vulcanized cellular rubber product wherein the major amount of rubber in said product is the composition of claim 6.

17. A product according to claim 16 which contains about 100 to about 400 parts by weight of non-reinforcing filler per hundred parts by weight of rubber and about 50 to about 200 parts by weight of extender oil per hundred parts by weight of rubber.

18. A product according to claim 17 wherein the rubber in said product consists of said medium vinyl polybutadiene and said high trans polybutadiene.

19. A product according to claim 18 comprising a sheet having a corrugated effect on both its upper and lower surfaces.

* * * * *